Feb. 7, 1950 C. MELIDONI 2,497,007
CABLE ADJUSTER
Filed Oct. 4, 1946
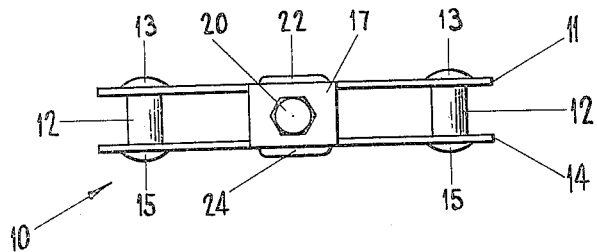
FIG.1    FIG.3
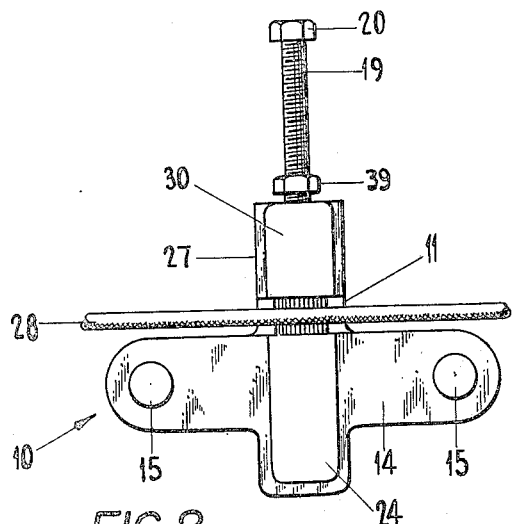
FIG.2
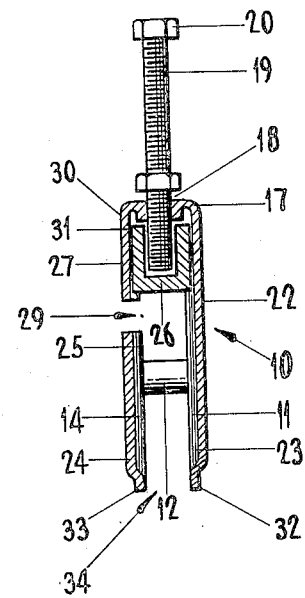
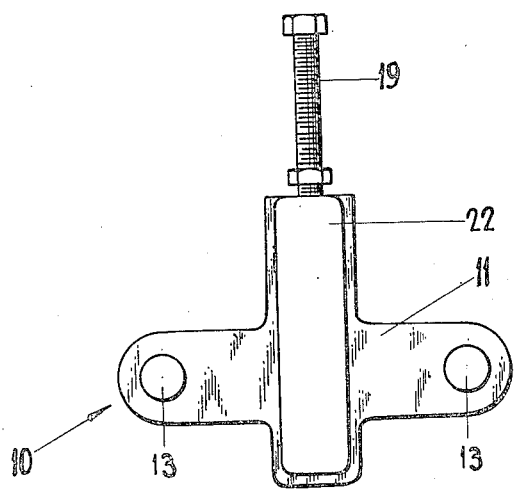
FIG.4
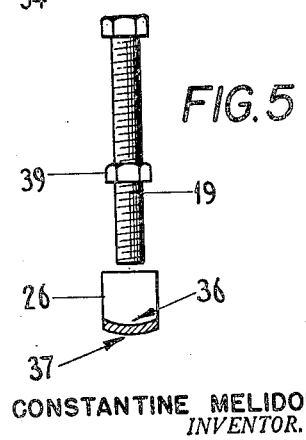
FIG.5
CONSTANTINE MELIDONI
INVENTOR.
BY Joseph Blacker
ATTORNEY Patented Feb. 7, 1950

2,497,007

UNITED STATES PATENT OFFICE 2,497,007

CABLE ADJUSTER

Constantine Melidoni, Fort Lee, N. J.

Application October 4, 1946, Serial No. 701,363

4 Claims. (Cl. 24—71.1)

This invention relates to a direct transverse and linear entrance adjuster which will tighten a cable in position without disconnecting the connected ends of the cable.

An object of this invention is to provide a cable take-up device having means for engaging a cable intermediate its connected ends and whereby a tightening operation may be carried out on the cable without the need of special tools.

Another object of this invention is to provide a take-up device having a lock nut in threaded engagement with a threaded bolt whereby when adjustment has been made, the lock nut will lock the bolt in set position and maintain the adjustment.

Another object of this invention is to provide a cable adjuster which can be made of stamped sheet metal whereby the device may be produced at a low cost so as to be available to the vast majority of users of such devices.

Another object of this invention is to provide a cable adjuster having a cable contacting member slidable between two alined upright guideways which terminate at predetermined levels to prevent the cable contacting member from becoming disengaged from the guideways.

It is to be noted that the importance of the two alined upright guideways lies in the fact that they prevent the cable contacting member from moving out of vertical alinement. It is also to be noted that the cable contacting member has a concave wall into which the bolt enters and whereby the bolt is also restrained from moving out of alinement with the guideways. This reinforces the bolt against sideways wedging under load.

This application is an improvment on my application for Cable adjuster, now Patent Number 2,444,743, dated July 6, 1948.

With the above and other objects in view, the invention will be hereinafter more particularly described, and the combination and arrangement of parts will be shown in the accompanying drawings and pointed out in the claims which form part of this specification.

Reference will now be had to the drawings, wherein like numerals of reference designate corresponding parts throughout the several views, in which:

Figure 1 is a top plan view of the cable adjuster.

Figure 2 is a front elevation of the device, showing a linear opening for direct entrance of a cable into the cable adjuster.

Figure 3 is an end elevation of the device.

Figure 4 is a rear elevation of the device.

Figure 5 is an exploded view of an adjusting bolt and a slidable U-shaped cable contacting member.

In the illustrated embodiment of the invention, the numeral 10 indicates a direct entrance cable take-up device comprising a sheet metal main body member 11. The member 11 has two cable supports or pins 12 fixedly secured by heads 13 at opposite ends thereof.

The direct entrance take-up device 10 comprises a complementary sheet metal body member 14 which is of smaller dimensions than the plate body member 11. The pins 12 also pass through the body member 14 and have heads 15 which secure the members 11 and 14 in spaced-apart assembled relation.

As best shown in Figures 1 and 3, the main body member 11 has a right-angular portion 17 having a threaded aperture 18. Threadably mounted in the aperture 18 is a bolt 19 at one end of which is a head 20 which is preferably formed hexagonal.

The main body member 11 has a rib 22 extending outwardly therefrom and providing an elongated guideway 23. The complementary body member 14 has a rib 24 extending outwardly therefrom and providing a guideway 25. The guideways 23 and 25 are in alinement in vertical planes.

Mounted in the guideways 23 and 25 in the body members 11 and 14 is a U-shaped slidable cable contacting member 26. The right-angular portion 17 has an extension 27 parallel with the main body member 11. The extension 27 terminates in spaced-apart relation from the complementary body member 14 and forms a linear opening 29 therebetween for direct transverse and linear entrance of a cable 28 into the cable adjuster 10. It is to be noted that the extension 27 has a rib 30 extending outwardly therefrom and providing a guideway 31, which is in alinement with the guideway 25 and of the same dimensions. It will be seen that the slidable cable contacting member 26 will during its downward movement pass through the guideway 31 and then through the guideway 25, the member 26 being sufficiently long to pass by opening 29 without any danger of its falling out from the cable adjuster 10. During the downward movement of the member 26, the opposite upright side thereof is continually in engagement with the walls defining the guideway 23.

It is to be noted that the main body member 11 is of substantially U-shaped cross-section. Also that the complementary body member 14 is substantially T-shaped.

The lower end of the bolt 19 is under operating conditions in engagement with the slidable member 26. It will thus be seen that the bolt 19 may be rotated to move the slidable member 26 down within the limits of the lengths of the guideways 23 and 25.

It will be seen that upon rotating the bolt 19 the slidable member 26 may be moved downwardly and cause a tightening up of the cable 28.

It is also to be noted that the plate members 11 and 14 have extensions 32, 33, positioned lower than the cable supports 12, which form between them a cable guideway 34. The guideway 34 prevents disengagement of a slack cable from the device.

As shown in Figure 5, it is to be noted that the bottom of the bolt 19 is in contact with the concave upper surface 36 of the cable contacting member 26 whereby the bolt is centered during operating conditions. Also that the lower surface 37 of the member 26 is convex and in direct contact with the cable 28 and this prevents damage to the cable.

For the purpose of locking the bolt in set position after an adjustment has been made, I provide a locknut 39 which may be threaded into abutting and locked relation with the upper surface of the right-angular portion 17.

It is to be noted that while I have shown my cable adjuster as made of stamped sheet metal, that I may produce the entire body portion in one piece by die casting; the lower portions of the guideways extending to the very end to permit insertion and removal of a frictionally slidable cable contacting member 26. The lower extensions 32, 33 would not be necessary for the die cast modification.

In accordance with the patent statutes I have described and illustrated the preferred embodiment of my invention, but it will be understood that various changes and modifications can be made therein without departing from the spirit of the invention as defined by the appended claims.

I claim:

1. In a direct transverse and linear entrance cable adjuster, comprising a main body member substantially U-shaped in cross-section, a complementary body member of substantially T-shaped cross-section, cable supports securing said body members in spaced-apart relation from each other, said main body member comprising a right-angular portion having an extension parallel with said main body member, said extension stopping in spaced-apart relation from said complementary body member and forming a linear opening therebetween for direct transverse and linear entrance of a cable into said cable adjuster, said right-angular portion having a threaded aperture, a bolt threadably mounted in said aperture, said body members having ribs extending outwardly therefrom and forming upright guideways, a U-shaped cable contacting member slidably mounted in said guideways, the bottom wall of said cable contacting member having a concave upper surface for centering said bolt and a convex lower surface in direct contact with said cable, said body members having extensions positioned lower than said cable supports to prevent disengagement of a slack cable from said cable adjuster.

2. In a direct transverse and linear entrance cable adjuster, comprising a main body member substantially U-shaped in cross-section, a complementary body member of substantially T-shaped cross-section, cable supports securing said body members in spaced-apart relation from each other, said main body member comprising a right-angular portion having an extension parallel with said main body member, said extension terminating in spaced-apart relation from said complementary body member and forming a linear opening therebetween for direct transverse and linear entrance of a cable into said cable adjuster, said right-angular portion having a threaded aperture, a bolt threadably mounted in said aperture, said body members having outwardly extending upright guideways, a U-shaped cable contacting member slidably mounted in said guideways, the bottom wall of said cable contacting member having a concave upper surface and a convex lower surface in direct contact with said cable, said body members having parallel extensions positioned lower than said cable supports to prevent disengagement of a slack cable from said cable adjuster.

3. In a direct transverse and linear entrance cable adjuster, comprising a main body member substantially U-shaped in cross-section, a complementary body member of substantially T-shaped cross-section, cable supports securing said body members in spaced-apart relation from each other, said main body member comprising a right-angular portion having an extension parallel with said main body member, said extension terminating in spaced-apart relation from said complementary body member and forming a linear opening therebetween for direct transverse and linear entrance of a cable into said cable adjuster, said right-angular portion having a threaded aperture, a bolt threadably mounted in said right-angular portion, said body members and said main body extension having outwardly extending upright guideways, a U-shaped cable contacting member slidably mounted in said guideways, the bottom wall of said cable contacting member having a concave upper surface and a convex lower surface in direct contact with said cable, said body members having parallel extensions positioned lower than said cable supports to prevent disengagement of a slack cable from said cable adjuster.

4. In a direct linear entrance cable adjuster, comprising a main body member substantially U-shaped in cross-section, a complementary body member of substantially T-shaped cross-section, cable supports securing said body members in spaced-apart relation from each other, said main body member comprising a right-angular portion having an extension parallel with said main body member, said extension terminating in spaced-apart relation from said complementary body member and forming a linear opening therebetween for direct transverse and linear entrance of a cable into said cable adjuster, said right-angular portion comprising a threaded aperture, a bolt threadably mounted in relation to said right-angular portion, said body members and said main body extension having outwardly extending upright guideways terminating lower than said cable supports, and a U-shaped cable contacting member slidably mounted in said guideways.

CONSTANTINE MELIDONI.

REFERENCES CITED

The following references are of record in the file of this patent:

UNITED STATES PATENTS

| Number | Name | Date |
| --- | --- | --- |
| 284,969 | McIntosh | Sept. 11, 1883 |
| 972,489 | Adams | Oct. 11, 1910 |
| 2,336,818 | Topinka | Dec. 14, 1943 |
| 2,344,052 | Neale | Mar. 14, 1944 |
| 2,444,743 | Melidoni | July 6, 1948 |